United States Patent [19]

Covington, Roger G.

[11] 4,453,246
[45] Jun. 5, 1984

[54] RETAINING RINGS FOR OPTICAL DISC ASSEMBLIES

[75] Inventor: Covington, Roger G., Rochester, N.Y.

[73] Assignee: Eastman Kodak Company, Rochester, N.Y.

[21] Appl. No.: 431,853

[22] Filed: Sep. 30, 1982

[51] Int. Cl.³ .................... G01D 15/32; G11B 5/82
[52] U.S. Cl. ........................... 369/284; 346/137; 360/135; 369/287; 369/289; 369/291; 369/292
[58] Field of Search ............... 369/287, 289, 291, 292, 369/283, 284, 285, 286; 360/135; 346/137

[56] References Cited

U.S. PATENT DOCUMENTS

| 3,336,583 | 8/1967 | Comstock | 340/174.1 |
| 3,373,413 | 3/1968 | Treseder | 340/174.1 |
| 3,480,964 | 11/1969 | Ley | 346/137 |
| 3,805,292 | 4/1974 | Hashiguchi | 360/135 |
| 4,365,258 | 12/1982 | Geyer et al. | 369/287 |

FOREIGN PATENT DOCUMENTS 7712934  5/1978  Netherlands ................. 360/135

Primary Examiner—Steven L. Stephan
Attorney, Agent, or Firm—Milton S. Sales

[57] ABSTRACT

An optical disc assembly includes a record layer carrying, flexible disc-shaped support with an information storage region. An annular retaining ring comprising an inner and an outer member clamps an outer peripheral portion of the support as the ring members close together. The outer peripheral portion of the support is wrapped about a radially outward facing surface of the inner ring member and a second, larger radius peripheral support portion is pushed into an annular recess in the inner ring member. Means on the retaining ring cause the portion of the support which is pushed into the recess to form a scalloped configuration within the recess. This inhibits buckling of the support. Such buckling would set up stresses in the support which would tend to be transmitted radially along the support to the information storage region.

9 Claims, 7 Drawing Figures

RETAINING RINGS FOR OPTICAL DISC ASSEMBLIES

CROSS-REFERENCE TO RELATED APPLICATION

Reference is made herein to commonly-assigned, copending U.S. patent application Ser. No. 264,313, now U.S. Pat. No. 4,365,258 filed May 18, 1981 in the names of F. F. Geyer and E. M. Leonard.

BACKGROUND OF THE INVENTION

1. Field of the Invention

The present invention relates to record medium assemblies useful in high density storage of information by optical writing and/or reading, and more particularly to improved configurations for optical disc assembly retaining rings.

2. Description of the Prior Art

The currently preferred optical disc technology employs disc elements with spiral or concentric tracks of minute (e.g., on the order of a micron or less in size), optically-detectable marks. One real-time mode of recording (writing) such marks is by scanning tracks on the disc with an equivalently small beam of radiation (e.g., from a laser) which is modulated "off or on" according to an electrical signal representative of the information to be written. Information is recovered (read) by scanning the tracks with the same size or only slightly larger, but still very tightly focused, radiation (e.g. light) spot. The recovered information is in the form of a fluctuating electrical signal obtained from a photodetector that senses the read-out light reflected from the recorded disc.

In order to write and read information in the form of such minute markings, optical systems of high numerical aperture are used to fovus light to equivalently minute spots. Such optical systems have extremely small depths of focus and the proper positional relation between the writing or reading optical system, and the optical disc record surface must be stringently maintained both smooth and flat.

One approach to achieve requisite smoothness, flatness and protective requirements for high density storage of information is disclosed in commonly-assigned, copending U.S. patent application Ser. No. 264,313, filed May 18, 1981 in the names of F. F. Geyer and E. M. Leonard. In that approach an improved optical disc assembly adapted for high density storage of information comprises (i) a flexible, disc-shaped support carrying a record layer; (ii) a transparent disc-shaped cover sheet opposing the record layer, and (iii) an annular retaining ring for holding the support and cover sheet in circumferentially-symmetric tension.

SUMMARY OF THE INVENTION

By the present invention, accurate positioning of the record layer relative to the focal plane of the optical system of the cooperating write/read apparatus is assured while simplifying manufacturing operations.

An optical disc assembly in accordance with the invention includes a record layer carrying a flexible disc-shaped support with an information storage region. An annular retaining ring comprising an inner and an outer member clamps an outer peripheral portion of the support as the ring members close together. The outer peripheral portion of the support is wrapped about a radially outward facing surface of the inner ring member and a second, larger radius peripheral portion of the support is pushed into an annular recess in the inner ring member. Means on the retaining ring cause the portion of the support which is pushed into the recess to form a scalloped configuration within the recess. This inhibits buckling of the support. Such buckling would set up stresses in the support which would tend to be transmitted radially along the support to the information storage region.

The invention and its objects and advantages, will become more apparent in the detailed description of the preferred embodiments presented below.

BRIEF DESCRIPTION OF THE DRAWINGS

The description of preferred embodiments refers to the attached drawings wherein.

DESCRIPTION OF THE PREFERRED EMBODIMENTS

Figure 1:
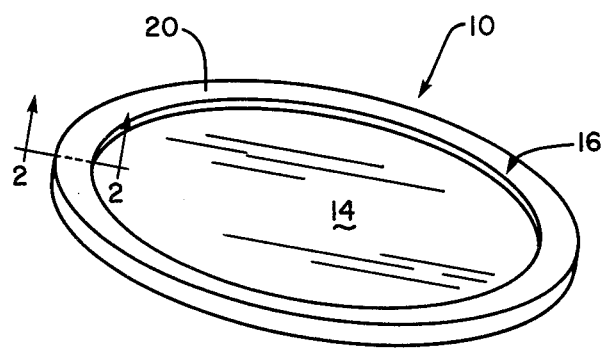
FIG. 1 is a perspective schematic view of one embodiment of an optical disc assembly according to the present invention.
Figure 2:
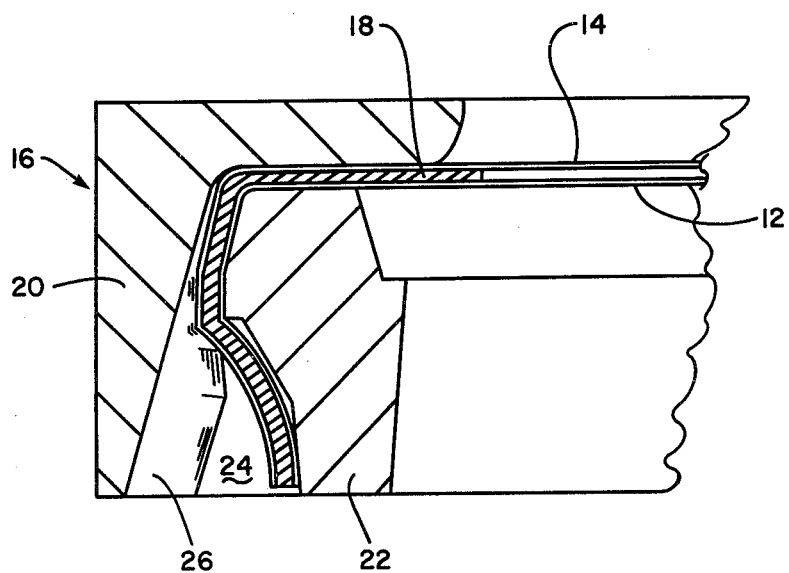
FIG. 2 is a fragmented sectional view taken through line 2—2 of FIG. 1.

Referring to FIGS. 1 and 2, an optical disc assembly 10 includes a web assembly having a flexible, disc-shaped support 12 carrying a record layer (and other appropriate layers) on one major surface of the support. The web assembly also includes a continuous, flexible, disc-shaped cover sheet 14 which is substantially transparent with respect to the write and/or read wavelength suitable for use with the record layer. The diameter of cover sheet 14 corresponds generally to the diameter of support 12.

The support and cover sheet are held in spaced relation by an annular retaining ring 16 and spacer 18. The retaining ring engages support 12 and cover sheet 14 substantially continuously at respective annular peripheral portions thereof. The web assembly has a predetermined information storage region radially inwardly of retaining ring 16 and spacer 18. Reference is made to aforementioned U.S. patent application Ser. No. 264,313 for a description of useful and preferred materials and characteristics for the disc-shaped support and the cover sheet.

The web assembly is retained in circumferentially-symmetric tension by cooperating annular ring members 20 and 22 of retaining ring 16. It is preferred that the cooperative engagement between disc-shaped support 12, cover sheet 14, and spacer 18 significantly seal the space between the record layer on support 12 and the opposed surface of cover sheet 14. Although not included in the illustrated embodiments, the optical disc assembly may have a central rigid hub for maintaining proper spacing between the record layer and the cover sheet.

Preferred tensions for the disc-shaped support and cover sheet materials are from substantially zero to just below the elastic limit, or yield point, of those materials. More specifically, the preferred tensions depend upon the desired degree of planarity for the particular member (i.e. size, composition, etc.) It is preferred that support material tension be below the elastic limit of the particular material; however, in certain applications some yield can be acceptable as long as surface planarity remains in the desired tolerance. In general, the tension should be selected with respect to the support material so that the stressed material's continuous relaxation over time (i.e. material creep) is slow enough to insure adequate spacing and planarizing tension throughout the expected product life period.

Figure 3:
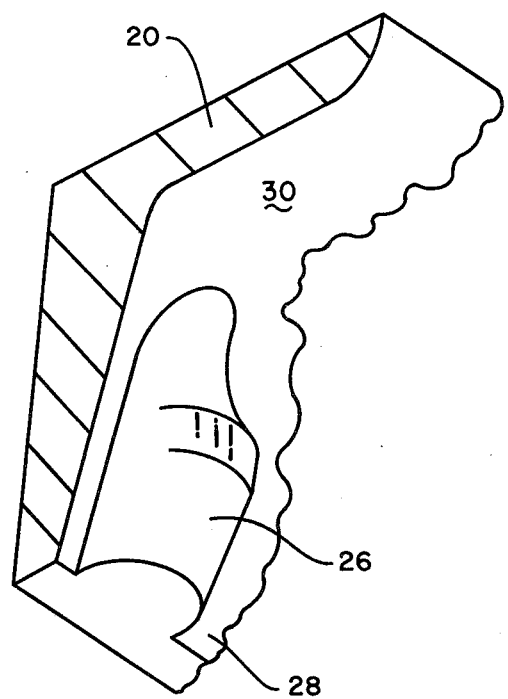
FIG. 3 is a fragmented perspective view of a portion of the disc assembly of FIG. 1.

Referring to FIG. 2, retaining ring members 20 and 22 have cooperating surface means for clamping the tensioned web assembly. Ring member 22 has an upper surface for locating support 12. A first annular portion of the web assembly wraps around a radially outward facing surface of member 22, and a second annular portion (of larger radius) is urged into an annular recess 24 by means on ring member 20; such as a plurality of projections 26, best seen in FIG. 3.

Figure 4:
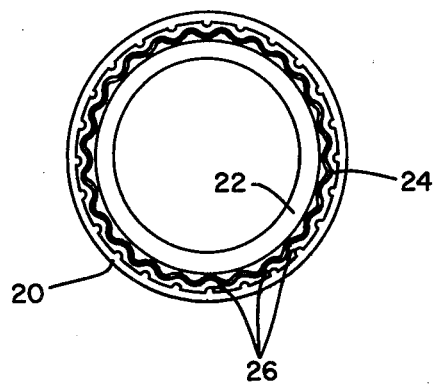
FIG. 4 is a bottom plan view of the optical disc assembly of FIG. 1.

Projections 26 are circumferentially spaced around surface 28. For example, FIG. 4 shows a suitable spacing of 15° for twenty-four such projections. During assembly, ring member 20 is lowered over the tensioned web assembly, and projections 26 cam outwardly to snap over the outer periphery of ring member 22 to hold the ring members together. Surface 30 (FIG. 3) on ring member 20 abuts cover sheet 14 so that the first annular portion of the web assembly is tightly clamped between the two ring members in circumferentially-symmetric tension.

Projections 26 push the depending portion of the web assembly radially inwardly into annular recess 24 of ring member 22. If this configuration were circumferentially consistent, the web assembly would buckle at the snap fit between ring members 20 and 22. Stresses in the web assembly set up by the buckling would tend to be transmitted along the web assembly through the retaining ring members to the information storage region of the web assembly.

This adverse effect is inhibited by providing means, such as spaced apart projections 26 for causing the peripheral portion of the web assembly to assume a scalloped configuration within recess 24 when viewed from below (FIG. 4).

Figure 5:
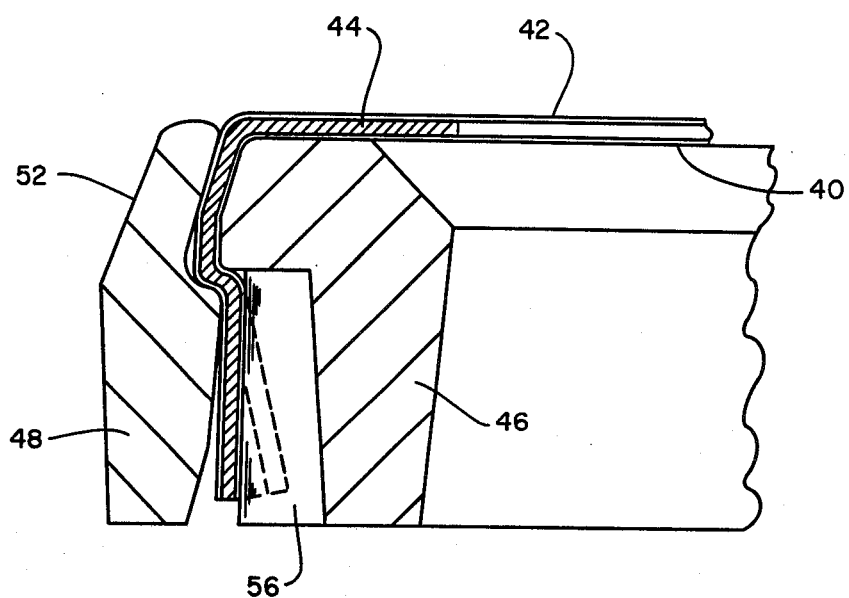
FIG. 5 is a fragmented sectional view similar to FIG. 2 of a second embodiment of an optical disc assembly according to the present invention.
Figure 6:
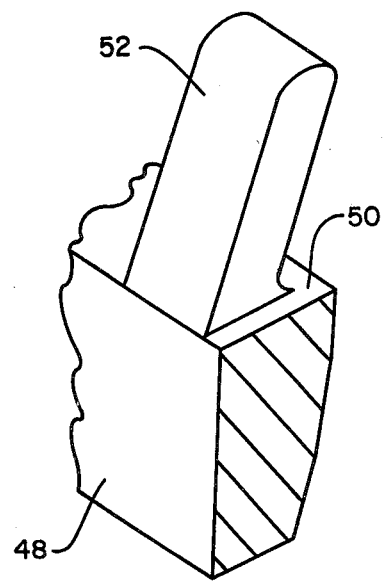
FIG. 6 is a fragmented perspective view of a portion of the optical disc assembly of FIG. 5.
Figure 7:
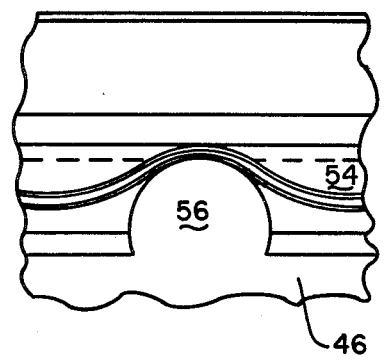
FIG. 7 is a fragmented bottom view of the optical disc assembly of FIG. 5.

FIGS. 5–7 illustrate a second embodiment of the present invention. A web assembly, which includes a support 40, a cover sheet 42 and a spacer 44 is stretched over an inner ring member 46. An outer ring member 48 is pushed downwardly over the web assembly and inner ring member until a lip 50 on ring member 48 snaps over the outer edge of ring member 46. Further downward travel of ring member 48 is restricted by a plurality of spring fingers 52, one of which is shown in FIG. 6. The spring fingers and lip 50 cooperate with ring member 46 to tightly hold the web assembly therebetween.

Lip 50 pushes the depending portion of the web assembly radially inwardly into the annular recess 54 of inner ring member 46. A plurality of projections 56 spaced about ring member 46 in recess 54 urge the web assembly into a scalloped configuration. This reduces the tendency of the web assembly to buckle and for stresses set up by such buckling being transmitted along the web assembly to the information storage region of the web assembly. Although only one projection 56 is illustrated, it will be understood that a plurality (such as twenty-four as in the first embodiment) of projections are spaced around ring member 46.

The invention has been described in detail with particular reference to certain preferred embodiments thereof, but it will be understood that variations and modifications can be effected within the spirit and scope of the invention.

We claim:

1. An optical disc assembly comprising:

a flexible, disc-shaped support carrying a record layer, said support having an information storage region and first and second annular portions radially outward of said storage region, said first annular portion having a smaller radius than said second annular portion;

an annular retaining ring engaging said support, said retaining ring comprising inner and outer ring members;

a radially outward facing surface on said inner ring member;

an annular recess on said inner ring member axial of and adjacent to said radially outward facing surface;

means on said outer ring member cooperative with said inner ring member for clamping said support therebetween in circumferentially-symmetric tension, with said first annular peripheral support portion wrapped about said outward facing surface of said inner ring member and said second annular peripheral support portion pushed into said annular recess; and means on said retaining ring for causing said second annular peripheral support portion to form a scalloped configuration within said recess.

2. An optical disc assembly comprising:

a flexible, disc-shaped support carrying a record layer, said support having an information storage region and first and second annular portions radially outward of said storage region, said first annular portion having a smaller radius than said second annular portion;

an annular retaining ring engaging said support, said retaining ring comprising inner and outer ring members;

a radially outward facing surface on said inner ring member;

an annular recess on said inner ring member axial of and adjacent to said radially outward facing surface;

means on said outer ring member cooperative with said inner ring member for clamping said support therebetween in circumferentially-symmetric tension, with said first annular peripheral support portion wrapped about said outward facing surface of said inner ring member and said second annular peripheral support portion pushed into said annular recess; and a plurality of projections on one of said ring members extending into said recess at circumferentially spaced intervals, whereby said second annular peripheral portion of said support forms a scalloped configuration within said recess.

3. An optical disc assembly comprising:

a flexible, disc-shaped support carrying a record layer, said support having an information storage region and first and second annular portions radially outward of said storage region, said first annular portion having a smaller radius than said second annular portion;

an annular retaining ring engaging said support, said retaining ring comprising inner and outer ring members;

a radially outward facing surface on said inner ring member;

an annular recess on said inner ring member axial of and adjacent to said radially outward facing surface;

means on said outer ring member cooperative with said inner ring member for clamping said support therebetween in circumferentially-symmetric tension, with said first annular peripheral support portion wrapped about said outward facing surface of said inner ring member and said second annular peripheral support portion pushed into said annular recess;

a plurality of projections on one of said ring members extending into said recess at circumferentially spaced intervals, whereby said second annular peripheral portion of said support forms a scalloped configuration within said recess; and means including said projections for effecting a snap fit between said inner and outer ring members.

4. An optical disc assembly comprising:

a flexible, disc-shaped web assembly including a support carrying a record layer, said web assembly having an information storage region and first and second annular portions radially outward of said storage region, said first annular portion having a smaller radius than said second annular portion;

an annular retaining ring engaging said web assembly, said retaining ring comprising inner and outer ring members;

a radially outward facing surface on said inner ring member;

an annular recess on said inner ring member axial of and adjacent to said radially outward facing surface;

means on said outer ring member cooperative with said inner ring member for clamping said web assembly therebetween in circumferentially-symmetric tension, with said first annular peripheral portion wrapped about said outward facing surface of said inner ring member and said second annular peripheral portion pushed into said annular recess; and means on said retaining ring for causing said second annular peripheral portion to form a scalloped configuration within said recess.

5. An optical disc assembly comprising:

a flexible, disc-shaped web assembly including (1) a support carrying a record layer, (2) a cover sheet generally coextensive with said support, (3) annular spacing means between said support and said cover sheet for forming an axial space between said record layer and said cover sheet, (4) an information storage region radially inwardly of said annular spacing means, and (5) first and second annular web assembly portions radially outward of said storage region, said first annular portion having a smaller radius than said second annular portion;

an annular retaining ring engaging said web assembly, said retaining ring comprising inner and outer ring members;

a radially outward facing surface on said inner ring member;

an annular recess on said inner ring member axial of and adjacent to said radially outward facing surface;

means on said outer ring member cooperative with said inner ring member for clamping said web assembly therebetween in circumferentially-symmetric tension, with said first annular peripheral support portion wrapped about said outward facing surface of said inner ring member and said second annular peripheral support portion pushed into said annular recess; and means on said retaining ring for causing said second annular peripheral support portion to form a scalloped configuration within said recess.

6. An annular retaining ring for receiving a flexible, disc-shaped support having a record layer, an information storage region, and first and second annular portions radially outward of the storage region with the first annular portion having a smaller radius than the second annular portion; said annular retaining ring comprising:

inner and outer ring members;

a radially outward facing surface on said inner ring member;

an annular recess on said inner ring member axial of and adjacent to said radially outward facing surface;

means on said outer ring member cooperative with said inner ring member for clamping the support therebetween in circumferentially-symmetric tension, with the first annular peripheral support portion wrapped about said outward facing surface of said inner ring member and the second annular peripheral support portion pushed into said annular recess; and means on said retaining ring for causing the second annular peripheral support portion to form a scalloped configuration within said recess.

7. An annular retaining ring for receiving a flexible, disc-shaped support having a record layer, an information storage region, and first and second annular portions radially outward of the storage region with the first annular portion having a smaller radius than the second annular portion; said annular retaining ring comprising:

inner and outer ring members;

a radially outward facing surface on said inner ring member;

an annular recess on said inner ring member axial of and adjacent to said radially outward facing surface;

means on said outer ring member cooperative with said inner ring member for clamping the support therebetween in circumferentially-symmetric tension, with the first annular peripheral support portion wrapped about said outward facing surface of said inner ring member and the second annular peripheral support portion pushed into said annular recess; and a plurality of projections on one of said ring members extending into said recess at circumferentially spaced intervals, whereby the second annular peripheral portion of the support forms a scalloped configuration within said recess.

8. An annular retaining ring for receiving a flexible, disc-shaped support having a record layer, an information storage region, and first and second annular portions radially outward of the storage region with the first annular portion having a smaller radius than the second annular portion; said annular retaining ring comprising:

inner and outer ring members;

a radially outward facing surface on said inner ring member;

an annular recess on said inner ring member axial of and adjacent to said radially outward facing surface;

means on said outer ring member coopertive with said inner ring member for clamping the support therebetween in circumferentially-symmetric tension, with the first annular peripheral support portion wrapped about said outward facing surface of said inner ring member and the second annular peripheral support portion pushed into said annular recess;

a plurality of projections on one of said ring members extending into said recess at circumferentially spaced intervals, whereby the second annular peripheral portion of the support forms a scalloped configuration within said recess; and means including said projections for effecting a snap fit between said inner and outer ring members.

9. An annular retaining ring for receiving a flexible, disc-shaped web assembly including a support carrying a record layer, the web assembly having an information storage region and first and second annular portions radially outward of the storage region with the first annular portion having a smaller radius than the second annular portion; said annular retaining ring comprising:

inner and outer ring members;

a radially outward facing surface on said inner ring member;

an annular recess on said inner ring member axial of and adjacent to said radially outward facing surface;

means on said outer ring member cooperative with said inner ring member for clamping the web assembly therebetween in circumferentially-symmetric tension, with the first annular peripheral portion wrapped about said outward facing surface of said inner ring member and the second annular peripheral portion pushed into said annular recess; and means on said retaining ring for causing the second annular peripheral portion to form a scalloped configuration within said recess.

* * * * *